US008112205B2

(12) United States Patent
Roudeau et al.

(10) Patent No.: US 8,112,205 B2
(45) Date of Patent: Feb. 7, 2012

(54) DEVICE AND METHOD FOR CONTROLLING TORQUE APPLIED TO WHEELS OF A VEHICLE

(75) Inventors: Frederic Roudeau, Vitry sur Seine (FR); Jean Bretheau, Antony (FR); Vincent Vermuse, Germain les Arpajon (FR)

(73) Assignee: Renault S.A.S., Boulogne (FR)

( * ) Notice: Subject to any disclaimer, the term of this patent is extended or adjusted under 35 U.S.C. 154(b) by 1073 days.

(21) Appl. No.: 11/596,880

(22) PCT Filed: May 30, 2005

(86) PCT No.: PCT/FR2005/050388
§ 371 (c)(1),
(2), (4) Date: Jun. 27, 2007

(87) PCT Pub. No.: WO2005/118327
PCT Pub. Date: Dec. 15, 2005

(65) Prior Publication Data

US 2007/0276571 A1 Nov. 29, 2007

(30) Foreign Application Priority Data

May 28, 2004 (FR) .................................... 04 05804

(51) Int. Cl.
*G06F 7/00* (2006.01)
*G06F 17/00* (2006.01)

(52) U.S. Cl. .......................................... 701/54; 477/120

(58) Field of Classification Search .................. 477/120, 477/115; 701/93, 1, 3, 36, 51, 54, 70, 78, 701/79, 83–88, 94, 99, 101; 123/396, 319, 123/363, 370
See application file for complete search history.

(56) References Cited

U.S. PATENT DOCUMENTS 5,123,301 A * 6/1992 Hagele et al. ................ 477/121
5,428,541 A * 6/1995 Miyata et al. .................. 701/85
5,496,227 A * 3/1996 Minowa et al. ................ 477/62
5,620,393 A * 4/1997 Minowa et al. ............... 477/155
5,684,699 A * 11/1997 Sugiyama ....................... 701/41
5,912,821 A * 6/1999 Kobayashi .................... 700/280
5,952,939 A * 9/1999 Nakazawa et al. ........... 340/903
6,068,574 A * 5/2000 Wild et al. .................... 477/110
6,188,964 B1 * 2/2001 Reister et al. .................. 702/17
(Continued)

FOREIGN PATENT DOCUMENTS

EP 0 280 757 9/1988
(Continued)

*Primary Examiner* — John Nguyen
*Assistant Examiner* — Michael Ng
(74) *Attorney, Agent, or Firm* — Oblon, Spivak, McClelland, Maier & Neustadt, L.L.P.

(57) ABSTRACT

A motor vehicle power train control device capable of furnishing set signals of torque applied to wheels of the motor vehicle. The control device includes a mechanism to generate a signal representing a limitation of variation in speed of a heat engine integrated in a power train capable of reducing variations that are disturbing with regard to acoustics of the power train, and includes a mechanism to determine an operating point of the power train in an optimal operating range according to the signal that represents limitation of speed. The mechanism for generating the signal that represents a limitation of variation in the speed of the heat engine integrated in the power train is furnished, at an input, by parameters that represent characteristics of the motor vehicle and by parameters that represent the driver's wishes.

5 Claims, 2 Drawing Sheets

U.S. PATENT DOCUMENTS 6,343,586 B1 * 2/2002 Muto et al. ............... 123/406.25
6,360,154 B1 * 3/2002 Krenn et al. .................... 701/54
6,401,694 B2 * 6/2002 Minowa et al. ............... 123/478
6,412,470 B1 * 7/2002 Denz ............................ 123/396
6,671,607 B2 * 12/2003 Ishizu et al. .................... 701/93
6,676,561 B2 * 1/2004 Fritzer et al. .................... 477/70
6,679,807 B2 * 1/2004 Kato et al. .................... 477/107

FOREIGN PATENT DOCUMENTS

EP 1275551 A1 * 1/2003
FR 2 827 339 1/2003
FR 2827339 A1 * 1/2003

* cited by examiner

DEVICE AND METHOD FOR CONTROLLING TORQUE APPLIED TO WHEELS OF A VEHICLE

BACKGROUND

The present invention relates to a device for controlling a power train suitable for delivering set-point signals of torque to be applied to the wheels of a motor vehicle, and an associated method.

The invention relates more particularly to a device for controlling a power train, that can be adapted to any type of motor vehicle and that can be used to control the variations in the engine speed of said power train in order to improve the acoustics felt by the driver and the passengers of the motor vehicle.

At the present time, in order to obtain a particularly satisfactory level of driving pleasure, efforts are made to minimize as much as possible the sound nuisances generated by the power train of the motor vehicle.

To this end, the applicant has developed a device for controlling the operating point of a motor vehicle power train, disclosed in document FR-A-2 827 339. The control applied by this device is a control of the torque applied to the wheels of the motor vehicle. The torque value to be applied to the wheels of the motor vehicle is calculated directly at the level of the wheels of the motor vehicle. Such a device is fitted with a module for interpreting the wishes of the driver, called IVC module, comprising in particular a generator for generating a signal representative of a limitation of variation in the speed of the power train suitable for reducing the acoustic variations of the power train that the driver is likely to hear.

Said signal is transmitted to a power train optimization block in order to control the torque to be applied to the wheels of the vehicle, the optimization block being used to determine an operating point in an optimal operating range of the power train based on driving pleasure constraint. The signal representative of a limitation of the speed of the power train suitable for reducing the acoustically disturbing variations of the power train is determined according to the activity of the driver and the speed of the motor vehicle.

Such a device, suitable for improving the acoustics felt by the people inside the passenger compartment, has the drawback of not allowing the variations of torque demand to be applied to the wheels to be correctly taken into account, the signal being determined mainly by the speed of the motor vehicle.

BRIEF SUMMARY

The object of the present invention is therefore to resolve this drawback and provide a device for controlling a power train that can take into account in a particularly accurate way the torque demand variations, and therefore indirectly, the speed of the power train, making it possible to determine appropriate limitations of the power train.

To this end, a device for controlling a power train of a motor vehicle suitable for delivering set-point signals of torque to be applied to the wheels of the motor vehicle, comprises a means of generating a signal representative of a limitation of variation in the speed of the heat engine incorporated in the power train suitable for reducing the variations that are disturbing from an acoustic point of view of said power train, and a means of determining an operating point of the power train in an optimal operating range of the power train according to the signal representative of speed limitation. The means of generating the signal representative of a limitation of variation in the speed of the heat engine incorporated in the power train is fed as input with parameters representative of the characteristics of the motor vehicle, and parameters representative of the wishes of the driver.

The torque set-point to be applied to the wheels is calculated directly at the level of the wheels of the motor vehicle.

With such a device, it thus becomes possible to provide a device for determining the operating range of the power train providing for a driving pleasure directly suited to the wishes of the driver sent, in particular, through the accelerator pedal. The device thus makes it possible to have acoustics of the power train dependent not only on the speed of the motor vehicle but also on the wishes of the driver. In other words, the device makes it possible to take into account the variations in the position of the accelerator pedal in order to generate limitations of speed of the heat engine of the power train, in addition to the acceleration or deceleration of the vehicle.

The parameters representative of the characteristics of the motor vehicle can comprise a parameter representative of the estimated or measured activity of the driver Acond, and a parameter representative of the speed of the motor vehicle Vveh.

Preferably, the parameters representative of the wishes of the driver comprise parameters representative of the position of the accelerator pedal Pedacc and parameters representative of the position of the brake pedal Pedfrein. Advantageously, the parameters representative of the wishes of the driver comprise, in addition, a parameter representative of the gradient of the position of the accelerator pedal Pedacc_grd.

In an embodiment, the parameter representative of the gradient of the position of the accelerator pedal Pedacc_grd has been filtered by a filtering means and/or delayed by a timer means before feeding the generation means with said Pedacc_grd parameter.

The generation means advantageously produces two limitation signals (lim_var_rpm_pos, lim_var_rpm_neg) defined by the relations:

$$\text{lim\_var\_rpm\_pos} = F1(\text{Acond},\text{Vveh})$$

$$\text{lim\_var\_rpm\_pos} = F2(\text{Acond},\text{Vveh})$$

in which the variable functions F1 and F2 depend on the position of the accelerator pedal and on the gradient of the position of said pedal, said functions being determined by interpolation tables, the parameters of which are determined definitively when tuning the vehicle.

The invention also relates to a method of controlling a motor vehicle power train suitable for delivering set-point signals of torque to be applied to the wheels of the motor vehicle, in which there is generated a signal representative of a limitation of the speed of the heat engine incorporated in the power train suitable for reducing the variations that are disturbing from an acoustic point of view of said power train, an operating point of the power train is determined in an optimal operating range of the power train according to the signal representative of speed limitation. Said signal representative of a limitation of variation in the speed of the heat engine incorporated in the power train is generated according to input parameters representative of the characteristics of the motor vehicle and parameters representative of the wishes of the driver.

Advantageously, a limitation of the speed of the heat engine incorporated in the power train is generated according to the depression of the accelerator pedal Pedacc. Said limitation can also be generated according to the depression of the brake of the vehicle and/or according to the gradient of the position of the accelerator pedal Pacc_grd.

In an embodiment, the limitation of the speed of the heat engine incorporated in the power train comprises at least one of the following steps:

the depression of the accelerator pedal is compared to a first predetermined position threshold corresponding to a depression state beyond the hard point of the accelerator pedal, the depression of the accelerator pedal is compared to a second predetermined position threshold corresponding to a significant depression state of the pedal although less than the first threshold, the depression of the accelerator pedal is compared to a third predetermined position threshold corresponding to a depression state of the pedal than the second threshold, the depression gradient of the accelerator pedal is compared to a fourth predetermined position variation threshold corresponding to a fast depression of said pedal, the depression gradient of the accelerator pedal is compared to a fifth predetermined position variation threshold corresponding to a rapid release of said pedal, each step determining a limitation of the speed of the heat engine between operating limit values or authorizing the next step according to the value of the parameters.

BRIEF DESCRIPTION OF THE DRAWINGS

The invention and its advantages will be better understood from studying the description of an embodiment that is by no means limiting, and illustrated by the appended drawings in which.

DETAILED DESCRIPTION

Figure 1:
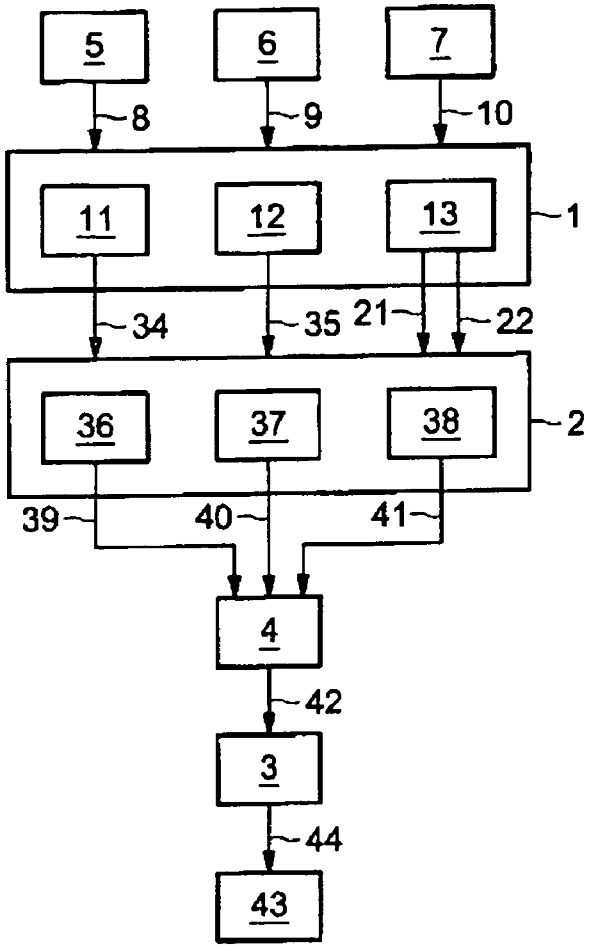
FIG. 1 is a block diagram of a control device according to the present invention.

FIG. 1 shows a control device comprising a means 1 of interpreting the wishes of the driver, a means 2 of determining an operating point in an optimal operating range of a power train 3 and a means 4 of applying the determined operating point.

The means 1 is connected to three input modules 5, 6 and 7, respectively via connections 8, 9 and 10, suitable for generating a signal representative of a quantity measured by sensors (not shown) mounted on the vehicle.

The module 5 supplies the characteristics of the vehicle, in particular the behavior profiles of the vehicle programmed by the manufacturer to characterize the behavior of the vehicle delivered to a customer. The module 6 is capable of generating data by providing the interface between the human driver and the rest of the motor vehicle according to the man/machine interface technique. The module 7 is capable of generating signals concerning the environment of the motor vehicle. The latter make it possible to take account of the state of the motor vehicle and its situation in the environment, for example the speed of the motor vehicle, the condition of the road or the weather conditions. The parameter values and the state variables of the input data transmitted by these three modules can be stored in a memory common to each element of the device (not shown).

The means 1 comprises a generator 11 of torque set-point to be applied to the wheels comprising a static component, called static torque Cs, and a generator 12 of torque set-point to be applied to the wheels comprising a dynamic component, called dynamic torque Cd. Such torque set-point generators can, for example, be generators as disclosed in application FR-A-2 827 339.

The means 1 also comprises a means 13 of generating a limitation of variation in the speed of the heat engine of the power train suitable for generating two limitation set-point signals 21, 22, called positive speed limit lim_var_rpm_pos to limit the speed variations in the increasing direction, and negative speed limit lim_var_rpm_neg to limit the variations in the engine speed in the reducing direction. The limitation of speed variation defines the variation of engine speed during a determined time interval.

Figure 2:
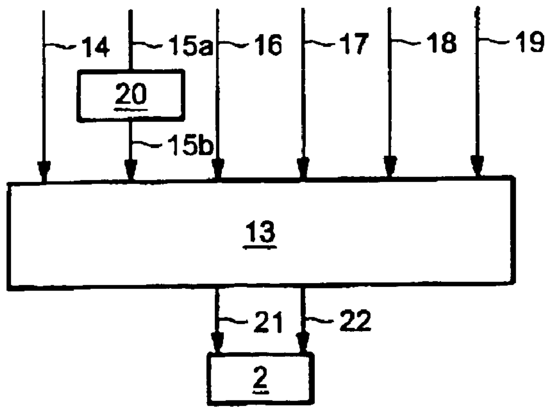
FIG. 2 is a block diagram of a means of generating a signal from the control device of FIG. 1, and FIG. 3 diagrammatically illustrates the different operating steps of a generation means of FIG. 2.

As illustrated in FIG. 2, the generation means 13 receives as input data representative of the wishes of the driver and data representative of the characteristics of the motor vehicle.

The data representative of the wishes of the driver, transmitted respectively by the connections 14, 15*a*, 16 and 17, includes:

Pedacc: the information representative of the depression state of the accelerator pedal of the vehicle, via a sensor (not shown), Pedacc_grd: the gradient of the position of the accelerator pedal based on the depression state of the accelerator pedal relative to a preceding depression state, said gradient being calculated via a specific operator (not shown) calculating a drift of successive positions of the accelerator pedal, Kick: the depression of the accelerator pedal beyond a physical end stop also called hard point of the accelerator, that can in particular be used, on a conventional discrete ratio type automatic transmission, to force the downshift to the lower gear in order to obtain a momentary increase in acceleration that may be necessary, for example, when overtaking, Pedfrein: the information representative of the depression state of the brake pedal of the vehicle, via a sensor (not shown).

The data representative of the gradient of the accelerator pedal can advantageously be filtered by a filtering means 20, such as a filter, before being transmitted via the connection 15*b* to the generation means 13 in order to eliminate any stray noises. It is also possible to envisage the provision of a timer means (not shown) suitable for storing a maximum value of the gradient of the position of the pedal for a given time interval to transmit it to the generation means 13.

The data representative of the characteristics of the motor vehicle, respectively transmitted via the connections 18 and 19, comprises:

Acond: the estimated or measured activity of the driver (as a percentage), that can be read from the memory storing the activity of the driver, Vveh: the speed of the vehicle (in km/h), that can be read or interpreted from memories or state variables representing signals representing the speed of the vehicle.

From the data received as input, the generation means 13 make it possible to determine the limitation of speed variation in order to improve the acoustics inside the passenger compartment of the motor vehicle, by transmitting set-point signals of limitation of the speed variations in the increasing direction lim_var_rpm_pos and of speed limitation in the reducing direction lim_var_rpm_neg, respectively via the connections 21 and 22, to the means 2 of determining the operating point of the power train.

Figure 3:
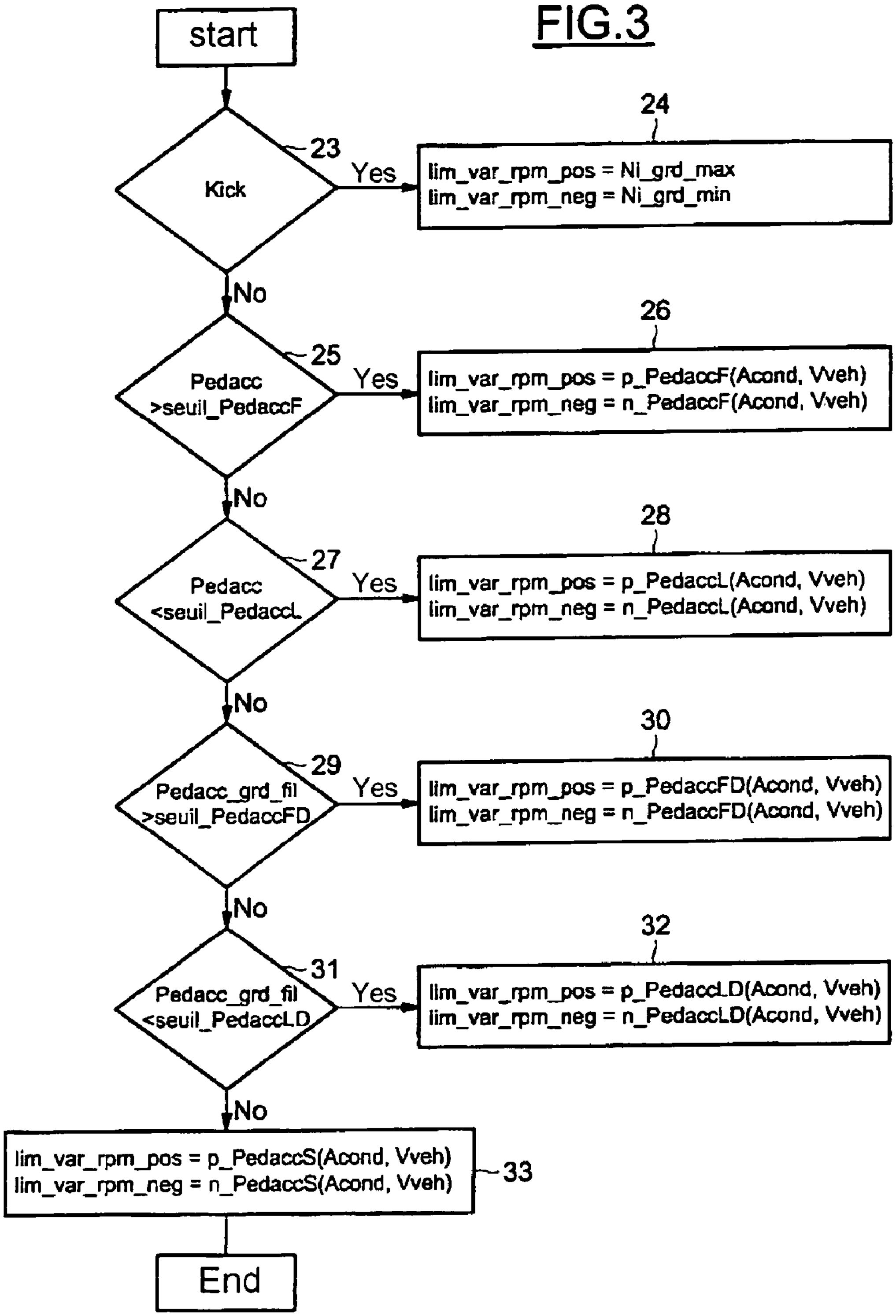

The flow diagram represented in FIG. 3 shows the various analysis and comparison tests performed on the data transmitted via the connections 14 to 19 (FIG. 2). These tests are carried out by different comparison means, for example comparators, according to the following process.

A first step 23 consists in determining if the accelerator pedal is depressed beyond a first threshold, in this case beyond the hard point of the accelerator called kick. If the depression of the accelerator pedal PedAcc is greater than the depression corresponding to the hard point kick, then the generation means 13 chooses a first mode 24 in which the variable lim_var_rpm_pos takes the calibratable value Ni_grd_max and the variable lim_var_rpm_neg takes the calibratable value Ni_grd_min, where Ni represents a speed set-point of the heat engine incorporated in the power train 3 (FIG. 1), predetermined in order to obtain a limitation of the operating point making it possible to achieve the maximum performance levels of said power train 3 while having enhanced acoustics for the people inside the passenger compartment of the motor vehicle.

If the depression of the accelerator pedal is less than the depression corresponding to the hard point kick, then the generation means 13 switches to the step 25 and checks if the depression of the accelerator pedal Pedacc is greater than a second threshold seuil_PedaccF corresponding to a depression of the accelerator pedal close to 100%, that can be, for example, 95%. If the depression of the accelerator pedal of the motor vehicle is strictly greater than the predetermined threshold of depression of the accelerator pedal (Pedacc>seuil_PedaccF), then the generation means 13 switches to a second mode 26 in which the variable lim_var_rpm_pos is calculated based on a calibratable map p_PedaccF and the variable lim_var_rpm_neg is calculated from a calibratable map n_PedaccF. These two maps depend on the driver activity information Acond and the speed of the motor vehicle Vveh respectively transmitted via the connections 18 and 19 (FIG. 2), said data Acond and Vveh being able to be respectively read or interpreted from the memory storing the profile of the driver, and from the memory or state variables representing signals describing the environment of the vehicle.

If the depression of the accelerator pedal is less than the depression corresponding to the second threshold seuil_PedaccF, then the generation means 13 switches to the step 27 and checks if the depression of the accelerator pedal Pedacc is below a third threshold seuil_PedaccL corresponding to a depression of the accelerator pedal close to 0%, that can be, for example, 10%. If the depression of the accelerator pedal of the motor vehicle is strictly below the predetermined threshold of depression of the accelerator pedal (Pedacc<seuil_PedaccL), then the generation means 13 switches to a third mode 28 in which the variable lim_var_rpm_pos is calculated from a calibratable map p_PedaccL and the variable lim_var_rpm_neg is calculated from a calibratable map n_PedaccL. These two maps depend on driver activity information Acond and the speed of the motor vehicle Vveh.

If the depression of the accelerator pedal is greater than the third threshold PedaccL, then the generation means 13 switches to the step 29 and checks if the filtered gradient of the depression of the accelerator pedal Pedacc_grd_fil is greater than a fourth threshold PedaccFD corresponding to a rapid depression of the accelerator pedal without, however, the position of the accelerator pedal reaching the second threshold seuil_PedAccF. If the gradient of the position of the accelerator pedal of the motor vehicle is strictly greater than the predetermined threshold (Pedacc_grd_fil>seuil_PedaccFD) then the generation means 13 switches to a fourth mode 30 in which the variable lim_var_rpm_pos is calculated from a calibratable map p_PedaccFD and the variable lim_var_rpm_neg is calculated from a calibratable map n_PedaccFD. These two maps depend on the driver activity information Acond and the speed of the motor vehicle Vveh.

If the gradient of the position of the accelerator pedal is less than the fourth threshold seuil_PedaccFD, then the generation means 13 switches to the step 31 and checks if the filtered gradient of the depression of the accelerator pedal Pedacc_grd_fil is less than a fifth threshold seuil_PedaccLD corresponding to a rapid release of the accelerator pedal without, however, reaching the third threshold seuil_PedaccL. If the gradient of the position of the accelerator pedal of the motor vehicle is strictly less than the predetermined threshold (Pedacc_grd_fil<seuil_PedaccLD), then the generation means 13 switches to a fifth mode 32 in which the variable lim_var_rpm_pos is calculated from a calibratable map p_PedaccLD and the variable lim_var_rpm_neg is calculated from a calibratable map n_PedaccLD. These two maps depend on the activity information of the driver Acond and the speed of the motor vehicle Vveh.

If the gradient of the position of the accelerator pedal of the motor vehicle is greater than the predetermined threshold (Pedacc_grd_fil>seuil_PedaccLD), then the generation means 13 switches to a sixth mode 33 in which the variable lim_var_rpm_pos is calculated from a calibratable map p_PedaccS and the variable lim_var_rpm_neg is calculated from a calibratable map n_PedaccS. These two maps depend on the driver activity information Acond and the speed of the motor vehicle Vveh, and correspond to an average position of the pedal between the second threshold seuil_PedaccF and the third threshold seuil_PedaccL.

The generation means 13 thus makes it possible to transmit a limitation of variation in the speed of the heat engine to the determination means 2 in order to improve the acoustics inside the passenger compartment of the motor vehicle, by transmitting the set-point signals of limitation of the variations in the speed of the heat engine in the increasing direction lim_var_rpm_pos and of limitation of the speed in the reducing direction lim_var_rpm_neg, to the determination means 2. Said variable limitation signals thus take into account the variations of the torque demand generated from the accelerator pedal Pedacc.

It is also possible to use, in a similar manner, the depression position of the brake pedal Pedfrein from the information transmitted via the connection 17 (FIG. 2) to the generation means 13, or even to stop the limitation of the speed variations when the driver depresses the brake pedal Pedfrein.

As illustrated in FIG. 1, the determination means 2 also receives a static torque set-point Cs from the generator 11 via the connection 34 and a static torque set-point Cd from the generator 12 via the connection 35.

The means 2 of determining the operating point of the power train 3 thus receives four control signals lim_var_rpm_pos, lim_var_rpm_neg, Cs and Cd. The determination means 2 thus makes it possible to independently parameterize its constituent modules 36, 37 and 38, the module 36 delivering a torque signal to the wheel C, the module 37 a battery power signal Pbat, and the module 38 a motor speed control signal N. Said signals are transmitted, respectively via the connections 39, 40 and 41, to the module 4 producing the operating point of the power train 3 used to control the control units of the power train 3 via the connection 42 and the drive wheels 43 via the connection 44 in a way similar to patent application FR-A-2 827 339 in the name of the applicant.

The present invention thus makes it possible to produce a control, applied to the wheel, of the operating point of the power train that makes it possible to generate speed limit set-points of said heat engine incorporated in the power train directly dependent on the state of the vehicle but also adapted to the wishes of the driver, in particular via the accelerator pedal, in order to obtain improved driving pleasure.

The invention claimed is:

1. A device for controlling a power train of a motor vehicle configured to deliver set-point signals of torque to be applied to wheels of the motor vehicle, comprising:

means for generating a limitation of variation in speed of a heat engine incorporated in the power train, including a first signal to limit speed variations in an increasing direction during a predetermined time interval below an upper limit value and a second signal to limit speed variations in a decreasing direction during the predetermined time interval above a lower limit value, the means for generating being configured to reduce noise generated by the variations that are disturbing from an acoustic point of view of the power train; and means for determining an operating point of the power train in an optimal operating range according to the first signal and the second signal such that the variations of the speed of the heat engine are maintained between the upper and lower limit values, wherein the means for generating receives parameters representative of characteristics of the motor vehicle, and parameters representative of wishes of the driver, including parameters representative of a position of an accelerator pedal, parameters representative of a position of a brake pedal, and a parameter representative of a gradient of the position of the accelerator pedal, wherein the means for generating sets the upper limit value to a first upper limit value and the lower limit value to a first lower limit value when depression of the accelerator pedal is greater than a first predetermined position threshold corresponding to a depression state beyond a hard point of the accelerator pedal, the first upper limit value and the first lower limit value correspond to maximum performance levels of the power train, wherein the means for generating sets the upper limit value to a second upper limit value and the lower limit value to a second lower limit value when the depression of the accelerator pedal is greater than a second predetermined position threshold corresponding to a depression state of the accelerator pedal and less than the first predetermined position threshold, the second upper limit value being calculated from a first positive speed variation map and the second lower limit value being calculated from a first negative speed variation map, wherein the means for generating sets the upper limit value to a third upper limit value and the lower limit value to a third lower limit value when the depression of the accelerator pedal is lower than a third predetermined position threshold corresponding to a depression state of the accelerator pedal, the third predetermined position threshold being less than the second predetermined position threshold, the third upper limit value being calculated from a second positive speed variation map and the third lower limit value being calculated from a second negative speed variation map, wherein the means for generating sets the upper limit value to a fourth upper limit value and the lower limit value to a fourth lower limit value when a depression gradient of the accelerator pedal is greater than a first position variation threshold corresponding to a fast depression of the accelerator pedal, and the depression of the accelerator pedal is greater than the third predetermined position threshold and less than the second predetermined position threshold, the fourth upper limit value being calculated from a third positive speed variation map and the fourth lower limit value being calculated from a third negative speed variation map, wherein the means for generating sets the upper limit value to a fifth upper limit value and the lower limit value to a fifth lower limit value when the depression gradient of the accelerator pedal is less than a second position variation threshold corresponding to a rapid release of the accelerator pedal, the second position variation threshold being less than the first position variation threshold, and the depression of the accelerator pedal is greater than the third predetermined position threshold and less than the second predetermined position threshold, the fifth upper limit value being calculated from a fourth positive speed variation map and the fifth lower limit value being calculated from a fourth negative speed variation map, and wherein the means for generating sets the upper limit value to a sixth upper limit value and the lower limit value to a sixth lower limit value when the depression gradient of the accelerator pedal is greater than the second position variation threshold and less than the first position variation threshold, and the depression of the accelerator pedal is greater than the third predetermined position threshold and less than the second predetermined position threshold, the sixth upper limit value being calculated from a fifth positive speed variation map and the sixth lower limit value being calculated from a fifth negative speed variation map.

2. The device as claimed in claim 1, wherein the parameter representative of the gradient of the position of the accelerator pedal is filtered by a filter before being fed to the means for generating.

3. The device as claimed in claim 1, wherein the means for generating stops the limitations of the speed variations when the brake pedal is depressed.

4. A method of controlling a motor vehicle power train configured to deliver set-point signals of torque to be applied to wheels of a motor vehicle, comprising:

generating a limitation of speed of a heat engine incorporated in the power train, including generating a first signal to limit speed variations in an increasing direction during a predetermined time interval below an upper limit value and a second signal to limit speed variations in a decreasing direction during the predetermined time interval above a lower limit value, the limitation being configured to reduce noise generated by the variations that are disturbing from an acoustic point of view of the power train, the generating the limitation including receiving parameters representative of characteristics of the motor vehicle and parameters representative of wishes of the driver, including parameters representative of a position of an accelerator pedal, parameters representative of a position of a brake pedal, and a parameter representative of a gradient of the position of the accelerator pedal, setting the upper limit value to a first upper limit value and the lower limit value to a first lower limit value when depression of an accelerator pedal is greater than a first predetermined position threshold corresponding to a depression state beyond a hard point of the accelerator pedal, the first upper limit value and the first lower limit value correspond to maximum performance levels of the power train, setting the upper limit value to a second upper limit value and the lower limit value to a second lower limit value when the depression of the accelerator pedal is greater than a second predetermined position threshold corresponding to a depression state of the accelerator pedal and less than the first predetermined position threshold, the second upper limit value being calculated from a first positive speed variation map and the second lower limit value being calculated from a first negative speed variation map, setting the upper limit value to a third upper limit value and the lower limit value to a third lower limit value when the depression of the accelerator pedal is lower than a third predetermined position threshold corresponding to a depression state of the accelerator pedal, the third predetermined position threshold being less than the second predetermined position threshold, the third upper limit value being calculated from a second positive speed variation map and the third lower limit value being calculated from a second negative speed variation map, setting the upper limit value to a fourth upper limit value and the lower limit value to a fourth lower limit value when a depression gradient of the accelerator pedal is greater than a first position variation threshold corresponding to a fast depression of the accelerator pedal, and the depression of the accelerator pedal is greater than the third predetermined position threshold and less than the second predetermined position threshold, the fourth upper limit value being calculated from a third positive speed variation map and the fourth lower limit value being calculated from a third negative speed variation map, setting the upper limit value to a fifth upper limit value and the lower limit value to a fifth lower limit value when the depression gradient of the accelerator pedal is less than a second position variation threshold corresponding to a rapid release of the accelerator pedal, the second position variation threshold being less than the first position variation threshold, and the depression of the accelerator pedal is greater than the third predetermined position threshold and less than the second predetermined position threshold, the fifth upper limit value being calculated from a fourth positive speed variation map and the fifth lower limit value being calculated from a fourth negative speed variation map, and setting the upper limit value to a sixth upper limit value and the lower limit value to a sixth lower limit value when the depression gradient of the accelerator pedal is greater than the second position variation threshold and less than the first position variation threshold, and the depression of the accelerator pedal is greater than the third predetermined position threshold and less than the second predetermined position threshold, the sixth upper limit value being calculated from a fifth positive speed variation map and the sixth lower limit value being calculated from a fifth negative speed variation map; and determining an operating point of the power train in an optimal operating range according to the first signal and the second signal such that the variations of the speed of the heat engine are maintained between the upper and lower limit values.

5. The method as claimed in claim 4, further comprising:

stopping the limitations of the speed variations when a brake pedal is depressed.

* * * * *